(12) United States Patent
Terada et al.

(10) Patent No.: US 10,810,712 B2
(45) Date of Patent: Oct. 20, 2020

(54) APPARATUS FOR MONITORING SURROUNDINGS OF VEHICLE AND METHOD OF CALIBRATING THE SAME

(71) Applicants: DENSO CORPORATION, Kariya, Aichi-pref. (JP); TOYOTA JIDOSHA KABUSHIKI KAISHA, Toyota-shi, Aichi-ken (JP); RICOH COMPANY, LTD., Tokyo (JP)

(72) Inventors: Toshihiko Terada, Kariya (JP); Masaki Kuwahara, Kariya (JP); Hiroaki Ito, Toyota (JP); Naohide Uchida, Numazu (JP); Jun Kishiwada, Tokyo (JP)

(73) Assignees: DENSO CORPORATION, Kariya, Aichi-Pref. (JP); TOYOTA JIDOSHA KABUSHIKI KAISHA, Toyota-Shi, Aichi-Ken (JP); RICOH COMPANY, LTD., Tokyo (JP)

( * ) Notice: Subject to any disclaimer, the term of this patent is extended or adjusted under 35 U.S.C. 154(b) by 85 days.

(21) Appl. No.: 16/145,898

(22) Filed: Sep. 28, 2018

(65) Prior Publication Data

US 2019/0102869 A1 Apr. 4, 2019

(30) Foreign Application Priority Data

Sep. 29, 2017 (JP) ................................ 2017-192066

(51) Int. Cl.
*G06T 5/00* (2006.01)
*G06T 5/50* (2006.01)
(Continued)

(52) U.S. Cl.
CPC ................ *G06T 5/006* (2013.01); *G06T 5/50* (2013.01); *G06T 7/593* (2017.01); *G06T 7/85* (2017.01); *H04N 5/247* (2013.01); *G06T 2207/10012* (2013.01); *G06T 2207/20021* (2013.01); *G06T 2207/30252* (2013.01)

(58) Field of Classification Search
CPC .. G06T 5/006; G06T 5/50; G06T 7/85; G06T 2207/30252; H04N 5/247; H04N 13/239; B60K 2370/1529; B60K 2370/797; B60K 2370/175; G02B 2027/011;
(Continued)

(56) References Cited

U.S. PATENT DOCUMENTS 6,373,518 B1 4/2002 Sogawa
7,782,374 B2 * 8/2010 Suzuki .................. H04N 7/181
348/239

(Continued)

FOREIGN PATENT DOCUMENTS

JP 3284190 B2 5/2002
JP 4109077 B2 6/2008
(Continued)

*Primary Examiner* — Michael S Osinski
(74) *Attorney, Agent, or Firm* — Maschoff Brennan

(57) ABSTRACT

In an apparatus for monitoring surroundings of a vehicle based on a plurality of images captured by a plurality of imagers through a windshield of the vehicle, an image acquirer is configured to acquire the plurality of images captured by the plurality of imagers, and a distortion corrector is configured to correct the plurality of images based on an optical distortion distribution of the windshield.

9 Claims, 3 Drawing Sheets

(51) Int. Cl.
  *H04N 5/247* (2006.01)
  *G06T 7/593* (2017.01)
  *G06T 7/80* (2017.01)

(58) Field of Classification Search
  CPC ........ G02B 2027/0138; G02B 27/0025; B60R
    2300/105; G06K 9/00805; G06K 9/00845
  See application file for complete search history.

(56) References Cited

U.S. PATENT DOCUMENTS

| | | | | |
|---|---|---|---|---|
| 8,077,204 B2 * | 12/2011 | Yokochi | ............. | G06K 9/00805 348/148 |
| 8,373,751 B2 * | 2/2013 | Han | ........... | G06T 7/73 348/140 |
| 8,922,626 B2 * | 12/2014 | Aoki | ................... | H04N 13/296 348/47 |
| 9,440,660 B2 | 9/2016 | Sherony | ............. | B60W 50/12 |
| 9,542,608 B2 | 1/2017 | Katahira | ............ | G06K 9/00805 |
| 10,277,887 B2 | 4/2019 | Aoki | .................... | H04N 13/246 |
| 10,303,045 B1 * | 5/2019 | Sato | .................. | G02B 27/0179 |
| 10,459,440 B2 * | 10/2019 | Rust | ....................... | G01C 21/28 |
| 2002/0084950 A1 * | 7/2002 | Aoki | ................. | G02B 27/0101 345/7 |
| 2002/0089756 A1 * | 7/2002 | Aoki | .................... | G02B 27/01 359/630 |
| 2004/0113866 A1 * | 6/2004 | Aoki | ..................... | B60K 35/00 345/7 |
| 2004/0260469 A1 * | 12/2004 | Mizusawa | ................. | B60R 1/00 701/300 |
| 2005/0157398 A1 * | 7/2005 | Nagaoka | ............ | G02B 27/0025 359/630 |
| 2006/0017807 A1 * | 1/2006 | Lee | ........................ | B60R 1/00 348/36 |
| 2007/0002145 A1 * | 1/2007 | Furukawa | .......... | H04N 5/23248 348/207.99 |
| 2008/0112058 A1 * | 5/2008 | Matsushita | ........ | G02B 27/0101 359/630 |
| 2008/0165084 A1 * | 7/2008 | Giegold | .................. | G06T 5/006 345/7 |
| 2009/0059041 A1 * | 3/2009 | Kwon | ................... | H04N 5/217 348/241 |
| 2009/0179773 A1 * | 7/2009 | Denny | ...................... | G06T 7/80 340/901 |
| 2009/0278765 A1 * | 11/2009 | Stringfellow | .......... | G02B 27/01 345/7 |
| 2009/0303616 A1 * | 12/2009 | Couery | ................... | B60R 1/081 359/727 |
| 2010/0060863 A1 * | 3/2010 | Hudman | ............... | G03B 21/147 353/70 |
| 2011/0299761 A1 * | 12/2011 | Myokan | .................. | G01B 11/26 382/154 |
| 2012/0133780 A1 * | 5/2012 | Zhang | ................... | H04N 17/002 348/187 |
| 2012/0224061 A1 * | 9/2012 | Pilgrim | .................. | H04N 7/183 348/148 |
| 2012/0314073 A1 * | 12/2012 | Shimoda | .................... | G06T 7/80 348/148 |
| 2013/0077825 A1 * | 3/2013 | Katahira | ............ | G06K 9/00805 382/103 |
| 2013/0321599 A1 * | 12/2013 | Harrold | ................ | G02B 6/0048 348/55 |
| 2014/0293425 A1 * | 10/2014 | Juhola | .................... | G02B 5/1895 359/571 |
| 2016/0023665 A1 * | 1/2016 | Sherony | ................ | B60W 50/12 701/2 |
| 2016/0137126 A1 * | 5/2016 | Fursich | ................ | H04N 13/239 348/38 |
| 2016/0223987 A1 * | 8/2016 | Park | ..................... | G03H 1/0808 |
| 2016/0353083 A1 * | 12/2016 | Aoki | ..................... | H04N 13/246 13/246 |
| 2016/0368417 A1 * | 12/2016 | Bassi | ........................ | B60R 1/00 |
| 2017/0169612 A1 * | 6/2017 | Cashen | .................... | G06T 19/20 |
| 2017/0322048 A1 * | 11/2017 | Yoshida | ..................... | G01C 3/00 |
| 2018/0017790 A1 * | 1/2018 | Kuzuhara | ............. | B60K 35/00 |
| 2018/0157035 A1 * | 6/2018 | Fujita | ...................... | B60K 35/00 |
| 2018/0252918 A1 * | 9/2018 | Takahashi | .......... | G02B 27/0101 |
| 2018/0268564 A1 * | 9/2018 | Sumikawa | .......... | G06K 9/00845 |
| 2019/0033588 A1 * | 1/2019 | Sadakane | ............. | G01M 11/00 |
| 2019/0124273 A1 * | 4/2019 | Liebetraut | ............. | G02B 13/08 |
| 2019/0137759 A1 * | 5/2019 | Hirata | .................... | B60K 35/00 |
| 2019/0285906 A1 * | 9/2019 | Ogino | ................ | G02B 27/0179 |
| 2019/0346676 A1 * | 11/2019 | Hirata | ..................... | H04N 5/74 |
| 2019/0369396 A1 * | 12/2019 | Smith | ................. | G02B 27/0101 |
| 2019/0375275 A1 * | 12/2019 | Irie | ......................... | B60J 1/002 |

FOREIGN PATENT DOCUMENTS

| | | | | |
|---|---|---|---|---|
| JP | 2013-024803 A | | 2/2013 | |
| JP | WO 2015/115669 | * | 8/2015 | ............... G01C 3/00 |
| JP | 2017-062198 A | | 3/2017 | |

* cited by examiner

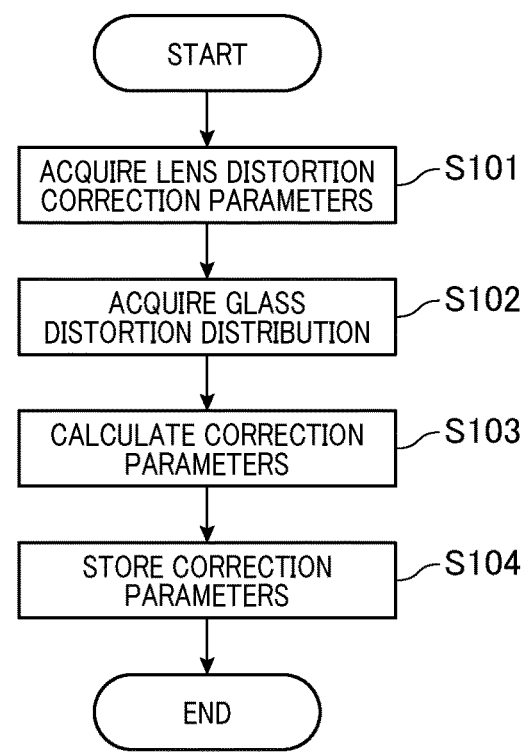
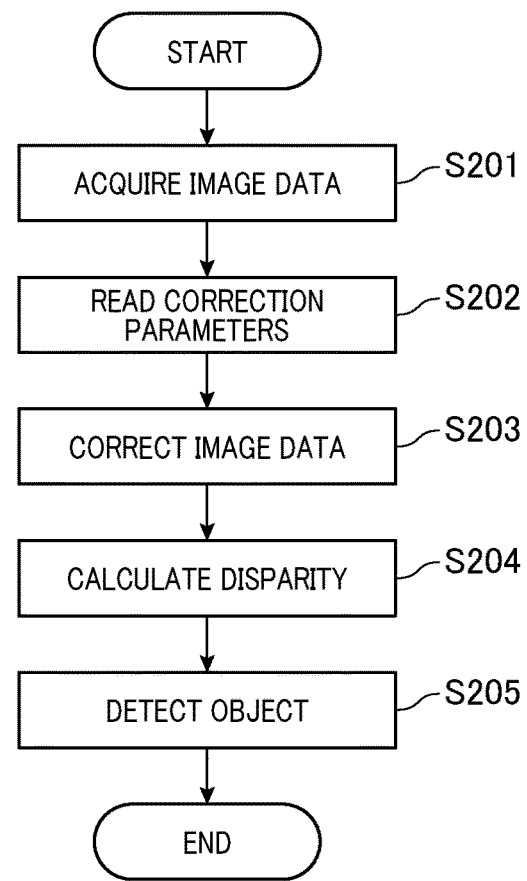

APPARATUS FOR MONITORING SURROUNDINGS OF VEHICLE AND METHOD OF CALIBRATING THE SAME

CROSS-REFERENCE TO RELATED APPLICATION

This application is based on and claims the benefit of priority from earlier Japanese Patent Application No. 2017-192066 filed on Sep. 29, 2017, the description of which is incorporated herein by reference.

BACKGROUND

Technical Field

This disclosure relates to an apparatus and a method for monitoring surroundings of a vehicle using a plurality of images captured by a plurality of imagers through a windshield of the vehicle.

Related Art

A technique is known for monitoring surroundings of a vehicle having a plurality of imagers of a stereo camera or the like disposed inside a front windshield of the vehicle based on a plurality of images of the surroundings of the vehicle captured simultaneously by the plurality of imagers through the front windshield. Disparity between a pair of images of the surroundings of the vehicle captured simultaneously by the stereo camera is calculated to monitor the surroundings of the vehicle.

There may be optical distortions in the images captured simultaneously by the plurality of imagers of the stereo camera or the like. The optical distortions may cause errors in the disparity calculated by a surroundings monitoring apparatus. The optical distortions may include an imager lens distortion, or a front-windshield distortion.

JP-A-2017-62198 discloses a technique for correcting the front-windshield distortion using a grid pattern board disposed in front of the stereo camera. Grid points and two markers corresponding to the respective imagers of the stereo camera are drawn on the grid pattern board. Alignment of this grid pattern board relative to the stereo camera is performed using the two markers. Thereafter, a pair of images of the grid pattern board is captured by the stereo camera, and coordinates of each grid point are calculated. Various types of data tables used to correct the coordinates of the respective grid points are stored in a storage. The front-windshield distortion correction of coordinates of each grid point on each captured image is made using one of or a combination of two or more of the data tables.

The technique disclosed in JP-A-2017-62198 needs to capture images of the grid pattern board to perform the front-windshield distortion correction. Ensuring the distortion correction accuracy needs accurate alignment of the grid pattern board relative to the stereo camera using the two markers.

In view of the above, it is desired to have a technique for calibrating an apparatus for monitoring surroundings of a vehicle without using any calibration tool, such as a grid pattern board.

SUMMARY

One aspect of the disclosure provides an apparatus for monitoring surroundings of a vehicle based on a plurality of images captured by a plurality of imagers through a windshield of the vehicle. This apparatus includes: an image acquirer configured to acquire the plurality of images captured by the plurality of imagers; and a distortion corrector configured to correct the plurality of images based on an optical distortion distribution of the windshield.

In the apparatus configured as above, the distortion corrector is configured to correct the plurality of images based on an optical distortion distribution of the windshield. With this configuration, calibration of the apparatus does not need proper adjustment of a position and a direction where a calibration tool, such as the grid pattern board, is placed.

Another aspect of the disclosure provides a method of calibrating an apparatus for monitoring surroundings of a vehicle based on a plurality of images captured by a plurality of imagers through a windshield of the vehicle. This method includes: acquiring the plurality of images captured by the plurality of imagers; and correcting the plurality of images based on an optical distortion distribution of the windshield.

BRIEF DESCRIPTION OF THE DRAWINGS

FIG. 3 is a flowchart of correction parameter calculation processing;

FIG. 4 is a flowchart of calibration and object detection processing performed by the surroundings monitoring apparatus.

DESCRIPTION OF SPECIFIC EMBODIMENTS

Figure 1:
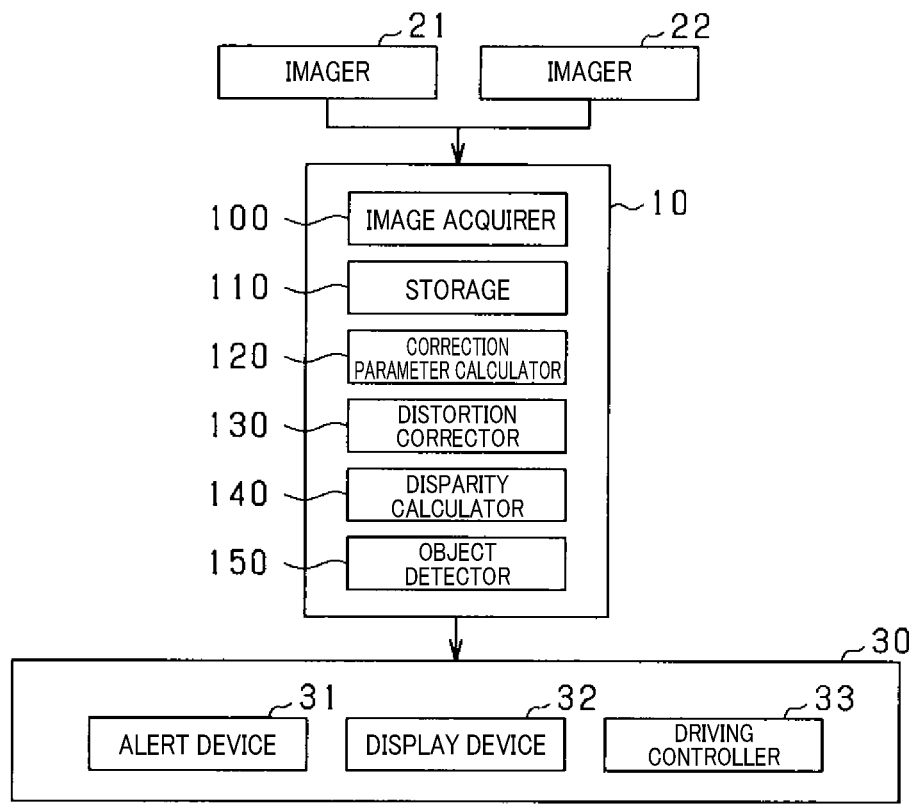
FIG. 1 is block diagram of a surroundings monitoring apparatus in accordance with one embodiment of the present disclosure.

Hereinafter, exemplary embodiments of the present disclosure will be described in detail with reference to the accompanying drawings, in which like reference numerals refer to like or similar elements and duplicated description thereof will be omitted.

As shown in FIG. 1, a surroundings monitoring apparatus 10 of the present embodiment includes an image acquirer 100, a storage 110, a correction parameter calculator 120, a distortion corrector 130, and a disparity calculator 140, and an object detector 150. The surroundings monitoring apparatus 10 may be configured as electronic control unit (ECU) including an analog-to-digital (A/D) converter circuit, an input/output interface (I/O), a central processing unit (CPU), a read-only memory (ROM), and a random-access memory (RAM), an image memory and other components. Various functions described later of the surroundings monitoring apparatus 10 may be implemented by the CPU executing programs prestored in the ROM or the like. Alternatively or additionally to the CPU, the surroundings monitoring apparatus 10 may include a field-programmable gate array (FPGA) having a digital processing circuit.

Image data output from the imagers 21, 22 is converted into digital signals and are then output to the CPU of the surroundings monitoring apparatus 10. Based on the input signals, the surroundings monitoring apparatus 10 calculates disparity between the input images to detect an object in the images captured by the imagers 21, 22. The surroundings monitoring apparatus 10 may output the image data and control signals to output devices 30, such as an alert device 31, a display device 32, and a driving controller 33.

The imagers 21, 22 form a stereo camera. Each of the imagers 21, 22 may include a charge-coupled device (CCD) camera, a complementary metal-oxide semiconductor (CMOS) image sensor, a near-infrared camera or the like. The imager 21, 22 are disposed behind a rearview mirror of a vehicle with a predefined baseline length in a widthwise direction of the vehicle. The imagers 21, 22 capture images of surroundings of the vehicle, including a road forward of the vehicle and a preceding vehicle. The imager 21 and the imager 22 are synchronized with each other to simultaneously capture a pair of images of surroundings of the vehicle. A reference image To captured by the imager 21 and a comparison image Tc captured by the imager 22 are output to the image acquirer 100 as a pair of digital images.

The image acquirer 100 acquires images captured simultaneously by the pair of imagers 21, 22, thereby acquiring a pair of images of the same object captured simultaneously from different positions. The pair of digital images acquired by the image acquirer 100 may be grayscale (e.g., 256-level grayscale) digital images converted by the A/D converter circuit from the pair of analog signals acquired from the imagers 21, 22. Such digital image data is represented in an x-y coordinate system having an origin at the upper left corner. In the x-y coordinate system, the x-coordinate axis lies in a horizontal direction and the y-coordinate axis lies in a vertical direction.

Data concerning the lens distortion of the imagers 21, 22, the images acquired by the image acquirer 100, disparity values calculated by the disparity calculator 140 are stored in the storage 110 as needed. Optical distortion distributions (hereinafter referred to as glass distortion distributions) of a front windshield, and correction parameters used by the surroundings monitoring apparatus 10 to calibrate the surroundings monitoring apparatus 10 are also stored in the storage 110.

Since the shape (e.g., a thickness, a curvature or the like) of the front windshield varies with vehicle types, the glass distortion distribution corresponding to the type of the vehicle carrying the surroundings monitoring apparatus 10 may be stored in the storage 110. In an alternative embodiment, the surroundings monitoring apparatus 10 may store glass distortion distributions for respective vehicle types. Upon mounting the surroundings monitoring apparatus 10 in a vehicle, the type of the vehicle may be selected in response to an extraneous input indicating type of vehicle. In another alternative embodiment, for each vehicle carrying the surroundings monitoring apparatus 10, the glass distortion distribution may individually be stored in the surroundings monitoring apparatus 10. The glass distortion distribution may be stored such that an amount of glass distortion B is stored in association with coordinates (x, y) of a respective pixel region of the image. The amount of glass distortion B may be expressed by a 2-dimensional vector representing a distortion amount in each of the X-axis direction and the Y-axis direction.

The glass distortion distribution may be precalculated based on a plurality of images captured a plurality of times by each of the plurality of imagers of the stereo camera or the like through the front windshield of the vehicle. In such an embodiment, the glass distortion distribution may be calculated by performing statistical processing as an average over glass distortion distributions of the plurality of images captured under different imaging conditions. In another alternative embodiment, the glass distortion distribution may be calculated based on numerical values representing the shape (e.g., a thickness, a curvature or the like) of the front windshield and optical properties. The glass distortion distribution may be calculated for each type of vehicle carrying the surroundings monitoring apparatus 10, or may be calculated for each individual vehicle.

Figure 2:
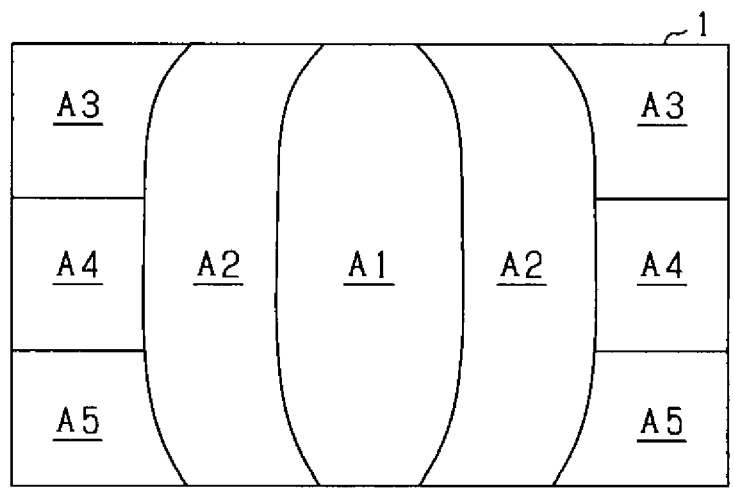
FIG. 2 is an example of a glass distortion distribution.

As shown in FIG. 2, the glass distortion distribution may represent a distribution of distortion (or deviation) amounts in pixel units over the image region 1 of the image data. The image region 1 is divided into pixel regions A1 to A5 having different amounts of distortion in pixel units. The pixel regions A1 to A5 have different amounts of distortion B1 to B5 satisfying the following inequality relation: B1<B2<B3<B4<B5. The storage 110 may store a table that correlates coordinates of the pixel regions A1 to A5 with amounts of distortion B1 to B5, as a glass distortion distribution.

As shown FIG. 2, in the glass distortion distribution over the image region 1, the amount of distortion decreases toward the center of the image region 1 and increases toward the perimeter of the image region 1. This is because the amount of distortion decreases as approaching the imagers. In the pixel regions A3 to A5 at lateral edges of the image region 1, the amount of distortion increases downward from the top to the bottom of the image region 1. This is because an amount of forward projection of the front windshield increases in a direction from the top (roof side) to the bottom of the image region 1.

The correction parameter calculator 120 reads the lens distortion of the imagers 21, 22 and the glass distortion distribution stored in the storage 110 and calculates correction parameters. The lens distortion of the imagers 21, 22 may be stored in the storage 110 as an amount of lens distortion L in association with coordinates (x, y) of each pixel region. The correction parameter calculator 120 may calculate, for the pixel region located at coordinates (x, y), a total amount of distortion that is a sum of an amount of lens distortion L and an amount of glass distortion B, that is, L+B, and calculate correction parameters that can correct the image data in response to the calculated total amount of distortion. More specifically, for example, the correction parameter calculator 120 may calculate correction parameters for image-shifting a position of the pixel region located at coordinates (x, y) on the image data based on the total amount of distortion (L+B). In one modification, the lens distortion of the imagers 21, 22 may be stored in the storage 110 as lens distortion correction parameters for correcting the lens distortion. The correction parameter calculator 120 may calculate glass distortion correction parameters for correcting the glass distortion of the front windshield based on the glass distortion distribution and then combine the lens distortion correction parameters read from the storage 110 and the calculated glass distortion correction parameters, thereby calculating correction parameters.

Calculation of the correction parameters by the correction parameter calculator 120 may only be performed prior to product delivery or may regularly be performed after product delivery. The correction parameters calculated by the correction parameter calculator 120 are stored in storage 110.

After the monitoring surroundings monitoring apparatus 10 has been mounted in the vehicle, the distortion corrector 130, the disparity calculator 140, and the object detector 150 perform processing relating to monitoring surroundings of the vehicle.

The distortion corrector 130 reads the correction parameters stored in the storage 110, and performs distortion correction of the image data acquired by the image acquirer 100. For example, the distortion corrector 130 may shift positions of the pixel regions of the image data using the correction parameters, produce corrected image data, and store the corrected image data in the storage 110.

The disparity calculator 140 calculates the disparity based on corrected image data that is the image data corrected by the distortion corrector 130. The disparity may be calculated by image-processing the corrected images in a well-known manner, such a stereo matching process or the like. More specifically, for example, the disparity calculator 140 searches for corresponding points (corresponding features) in a pair of images, and calculates the disparity for each pair of corresponding points. The disparity calculated by the disparity calculator 140 may be stored in the storage 110.

The object detector 150 detects an object and calculates a distance between the pair of imagers 21, 22 and the object based on the disparity calculated by the disparity calculator 140 for each pair of corresponding points. The object detector 150 may identify the object based on the magnitude of the disparity between the corresponding points included in the object and its variations over time in the disparity. The surroundings monitoring apparatus 10 may output to the output devices 30 the corrected image data calculated by the distortion corrector 130, disparity data calculated by the disparity calculator 140, data concerning the distance to and a type of the object detected by the object detector 150, and control signals based on such various data.

FIG. 3 illustrates a flowchart of correction parameter calculation processing performed by the surroundings monitoring apparatus 10 prior to product delivery. At step S101, the correction parameter calculator 120 acquires the lens distortion correction parameters stored in the storage 110.

At step S102, the correction parameter calculator 120 reads the glass distortion distribution from the storage 110.

At step S103, the correction parameter calculator 120 uses the lens distortion correction parameters and the glass distortion distribution to calculate correction parameters enabling both the lens distortion correction and the glass distortion correction. At step S104, the calculated correction parameters are stored in the storage 110. Thereafter, the process flow ends.

FIG. 4 illustrates a flowchart of calibration processing (at steps S201 to S203) and object detection processing (at steps S204, S205) both performed by the surroundings monitoring apparatus 10. The calibration processing is performed every time the object detection processing is performed.

At step S201, the image acquirer 100 acquires a pair of images captured simultaneously by the imagers 21, 22, converts the pair of images into digital image data, and stores the digital image data in the storage 110.

At step S202, the distortion corrector 130 reads the correction parameters and the image data from the storage 110. At step S203, the distortion corrector 130 corrects the image data via image shift processing or the like using the correction parameters, which enables correcting the image data based on the optical distortion distribution. The corrected image data is stored in the storage 110.

At step S204, the disparity calculator 140 calculates the disparity based on the image data corrected by the distortion corrector 130. For example, the disparity calculator 140 performs the stereo matching processing to search for corresponding points in the image data and calculates the disparity for each pair of the corresponding points. The disparity calculated by the disparity calculator 140 may be stored in the storage 110.

At step S205, the object detector 150 detects an object based on the disparity calculated by the disparity calculator 140 for each pair of corresponding points. Thereafter, the process flow ends. In the present embodiment, at step S205, based on the magnitude of the disparity between the corresponding points included in the object and its variations over time in the disparity, the object detector 150 may identify the object and calculate a distance to the object. In addition, in the present embodiment, the surroundings monitoring apparatus 10 may output to the output devices 30 the corrected image data calculated by the distortion corrector 130, disparity data calculated by the disparity calculator 140, data concerning the distance to and a type of the object detected by the object detector 150, and control signals based on such various data.

The present embodiment described above can provide the following advantages.

In the surroundings monitoring apparatus 10 configured as above, the distortion corrector 130 corrects the plurality of images based on the correction parameters calculated from the optical distortion distribution of the front windshield. With this configuration, calibration of the surroundings monitoring apparatus 10 does not need proper adjustment of a position and a direction where a calibration tool, such as a grid pattern board, is placed.

OTHER EMBODIMENTS

Figure 5:
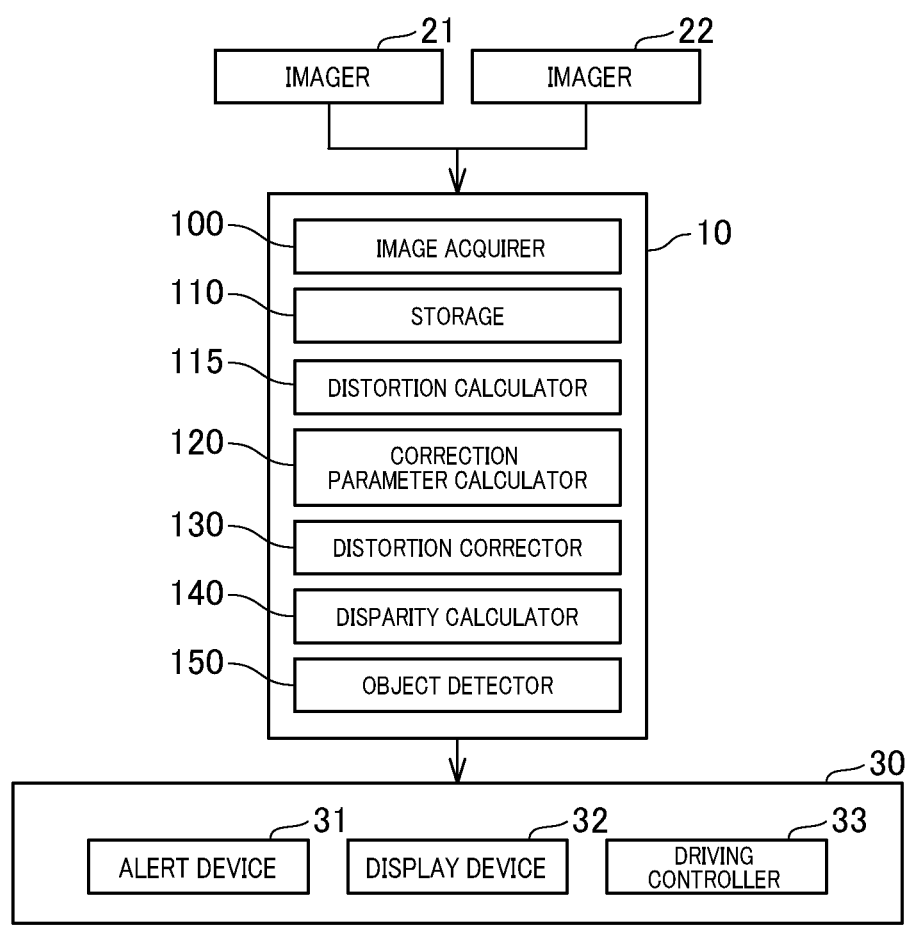
FIG. 5 is block diagram of a surroundings monitoring apparatus in accordance with another embodiment of the present disclosure.

In the present embodiment, the glass distortion distribution that is an optical distortion distribution of the front windshield is stored in the storage 110 prior to correction parameter calculation processing being performed. In an alternative embodiment, as shown in FIG. 5, the surroundings monitoring apparatus 10 may further include a distortion calculator 115 configured to calculate a glass distortion distribution based on the shape of the front windshield or the like. In another alternative embodiment, the parameter calculator 120 may perform processing similar to the processing performed by the distortion calculator. For example, the correction parameter calculator 120 may calculate the correction parameters based on the plurality of images captured by the imagers, such as the pair of imagers of the stereo camera, thorough the front windshield and the lens distortion correction parameters.

In the embodiment set forth above, the surroundings monitoring apparatus 10 includes the imagers and the output devices, such as an alert device, a display device, and a driving controller. In an alternative embodiment, the surroundings monitoring apparatus 10 may include the imagers and/or the output devices. In another alternative embodiment, the surroundings monitoring apparatus 10 may be integrated with the imagers and/or the output devices.

The embodiment disclosed as above may also be applicable to a rear front windshield, a door windshield or the like.

What is claimed is:

1. An apparatus for monitoring surroundings of a vehicle based on a plurality of images captured by a plurality of imagers through a windshield of the vehicle, the apparatus comprising:
    a processor to perform the function of:
        an image acquirer configured to acquire the plurality of images captured by the plurality of imagers;
        a correction parameter calculator configured to calculate a correction parameter used for calibration of the apparatus based on an amount of lens distortion of the plurality of imagers and an optical distortion distribution of the windshield; and
        a distortion corrector configured to correct the plurality of images based on the calculated correction parameter.

2. The apparatus according to claim 1, wherein the optical distortion distribution of the windshield is a distribution of amounts of distortion corresponding to positions of pixel regions on each of the plurality of images.

3. The apparatus according to claim 1, further comprising a storage storing optical distortion distributions of the windshield and the correction parameter calculated by the correction parameter calculator, wherein the distortion corrector is configured to correct the plurality of images based on the correction parameter read from the storage.

4. The apparatus according to claim 1, further comprising a distortion calculator configured to calculate the optical distortion distribution of the windshield.

5. A method of calibrating an apparatus for monitoring surroundings of a vehicle based on a plurality of images captured by a plurality of imagers through a windshield of the vehicle, the method comprising:

acquiring the plurality of images captured by the plurality of imagers;

calculating a correction parameter used for calibration of the apparatus based on an amount of lens distortion of the plurality of imagers and an optical distortion distribution of the windshield; and correcting the plurality of images based on the calculated correction parameter.

6. The apparatus according to claim 1, wherein the optical distortion distribution of the windshield is precalculated based on a plurality of images captured by the plurality of imagers through the windshield of the vehicle.

7. The apparatus according to claim 1, wherein the optical distortion distribution of the windshield is calculated based on numerical values representing a shape and optical properties of the windshield.

8. The apparatus according to claim 1, wherein the optical distortion distribution is calculated for each type of vehicle carrying the apparatus.

9. The apparatus according to claim 1, wherein the optical distortion distribution is calculated for each individual vehicle carrying the apparatus.

\* \* \* \* \*